(12) United States Patent
Satoh et al.

(10) Patent No.: US 7,369,349 B2
(45) Date of Patent: *May 6, 2008

(54) DATA STORAGE DEVICE WITH HEATER, AND CONTROL METHOD THEREFOR INVOLVING DIFFERENT CONTROL MODES

(75) Inventors: Noriaki Satoh, Kanagawa (JP); Masaharu Kawamura, Kanagawa (JP); Toyomi Ohsawa, Kanagawa (JP); Hideki Ohzeki, Kanagawa (JP); Kazunari Tsuchimoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,813

(22) Filed: Sep. 1, 2006

(65) Prior Publication Data
US 2007/0053103 A1    Mar. 8, 2007

(30) Foreign Application Priority Data
Sep. 2, 2005    (JP) .............................. 2005-254817

(51) Int. Cl.
G11B 21/02    (2006.01)
G11B 5/596    (2006.01)
(52) U.S. Cl. .................. 360/75; 360/78.04; 360/77.02
(58) Field of Classification Search .................... None
See application file for complete search history.

(56) References Cited

U.S. PATENT DOCUMENTS

| 7,088,545 | B1 * | 8/2006 | Singh et al. .................. 360/75 |
| 7,239,470 | B2 * | 7/2007 | Takahashi et al. ............ 360/75 |
| 2004/0165311 | A1 | 8/2004 | Yamanaka et al. | |

FOREIGN PATENT DOCUMENTS

| JP | 05-250643 | 9/1993 |
| JP | 2002-343049 | 11/2002 |
| JP | 2004-342151 | 12/2004 |

* cited by examiner

Primary Examiner—Andrew L. Sniezek
(74) Attorney, Agent, or Firm—Townsend and Townsend and Crew LLP; Patrick Duncan

(57) ABSTRACT

Embodiments of the invention reduce a possibility that a head will collide with a medium when the clearance between the head and the medium is adjusted by using a medium, and sufficiently reduce the clearance even at an initial stage of accessing a data area. In one embodiment, a hard disk drive (HDD) switches a heater from OFF to ON in the specified timing after a seek mode is switched to a following mode. Specifically, for example, on the completion of seek operation, in the timing in which a head arrives at a target track, or in the timing in which an HDC/MPU enters the following mode, the heater is turned ON, and this state is kept unchanged until access to the target sector is made.

17 Claims, 7 Drawing Sheets

DATA STORAGE DEVICE WITH HEATER, AND CONTROL METHOD THEREFOR INVOLVING DIFFERENT CONTROL MODES

CROSS-REFERENCES TO RELATED APPLICATIONS

This application claims priority from Japanese Patent Application No. JP2005-254817, filed Sep. 2, 2005, the entire disclosure of which is incorporated herein by reference. This application relates to concurrently filed U.S. patent application Ser. No. 11/514,813, the entire disclosure of which is incorporated herein by reference.

BACKGROUND OF THE INVENTION

The present invention relates to a data storage device and a control method therefor, and more particularly to a data storage device in which a head is provided with a heater for adjusting the clearance between the head and a medium, and to a control method for the heater.

Data storage devices using various types of media such as optical disks, magnetic tapes and semiconductor memories are known in the art. Among them, hard disk drives (hereinafter refer to as HDDs) have become popular as storage devices for computers to such an extent that they are one type of the storage devices indispensable for today's computers. Further, not limited to computer systems, HDDs are expanding more and more in application because of their excellent characteristics. For example, HDDs are used for moving picture recording/reproducing devices, car navigation systems, cellular phones, and removable memories for use in digital cameras.

A magnetic disk used in the HDD has a plurality of data tracks that are concentrically formed. A plurality of pieces of servo data each having address information, and a plurality of data sectors each including user data, are written to each data track. A plurality of data sectors are written between servo data areas. By accessing, according to the address information of the servo data, a desired data sector by use of a head element of a head slider supported by an actuator that pivotally moves, it is possible to write data to the data sector or to read data from the data sector.

In order to improve the recording density of a magnetic disk, it is important to reduce the clearance between the magnetic disk and a head element flying above the magnetic disk. For this reason, some mechanisms for adjusting the clearance are proposed. In one example of the mechanisms, a head slider includes a heater, and the clearance is adjusted by heating a head element by use of the heater (for example, refer to patent document 1 (Japanese Patent Laid-open No. 5-20635)). In this specification, this is called TFC (Thermal Flyheight Control). According to the TFC, an electric current is supplied to a heater to generate heat, which causes a head element to protrude. This makes it possible to reduce the clearance between a magnetic disk and a head element.

BRIEF SUMMARY OF THE INVENTION

The head element can protrude as a result of thermal expansion even during normal operation. There are two types of protrusion of the head element during normal operation. One is protrusion of the head element caused by an increase in environmental temperature; and the other is protrusion of the head element caused by heat generation of a write element at the time of writing data. Supplying a coil with an electric current causes the write element to generate a magnetic field so that write data is written to a magnetic disk. Accordingly, the write element generates heat by its write current.

In HDD design, in order to prevent a head element from colliding with a magnetic disk, the clearance is determined in consideration of protrusion caused by the above environmental temperature and protrusion caused by a write current. Therefore, for example, although it is possible to achieve sufficient read properties in a high temperature environment, there is a possibility that it will not be able to achieve sufficient read properties in a low temperature environment. In addition, because the proper length of time is required from a point of time at which the supply of an electric current to the write element is started until the head element protrudes, first writing to some data sectors is not sufficiently performed in some cases.

The TFC not only reduces the clearance between the head element and the magnetic disk, but also provides means for solving the problems of a decrease in read property, and of poor overwrite at the beginning of writing data. On the other hand, because the TFC causes a head element to protrude more greatly than in the normal state, it is likely to cause a collision between the magnetic disk and the head element. Therefore, it is very important for the TFC to control the timing of causing the head element to protrude by supplying the electric power to a heater.

When data is read or written, if the electric power is supplied to the heater before seek operation, the head element protrudes before the seek operation. This results in a great increase in the probability of a collision between the head element which largely moves in the seek operation and the magnetic disk. Moreover, if an area in proximity to the heater protrudes, properties of the ABS (Air Bearing Surface) changes. Accordingly, there is a possibility that the flyheight that meets design requirements will not be kept constant during the seek operation. On the other hand, if the heater is turned on when or after reading of data from the magnetic disk is started, or when or after writing of data to the magnetic disk is started, it is not possible to achieve sufficient access properties when a data sector is initially accessed. Because of this, it is important to cause the head element to protrude before a first data sector is accessed.

The present invention was devised taking the situations as described above into consideration. It is a feature of the present invention to allow a head to access (read or write) a date area with more accuracy and to reduce the possibility that the head will collide with the medium, in a technology for adjusting the clearance between the head and the medium by using a heater.

According to a first aspect of the present invention, there is provided a data storage device, which includes: a slider which flies above a rotating medium; a head element located at the slider; a controller which performs seek operation of the head element to seek a target track, and which performs the seek operation in a plurality of different control modes; and a heater which is located at the slider, the heater being brought into an ON state after a last mode of the seek operation starts and before the head element accesses a data area, the heater being continuously kept in the ON state until the head element accesses the data area so that the head element protrudes by thermal expansion to adjust the clearance between the head element and the medium. By bringing the heater into the ON state after the last mode of the seek operation starts and before the head element accesses the data area, it is possible to reduce a possibility of a collision between the head element and the medium, and also to cause the head element to sufficiently protrude in the timing in which the head element accesses the data area.

It is desirable that the heater be brought into an ON state in the timing in which the seek operation enters the last mode, and that the heater be continuously kept in the ON state until the head element accesses the data area. This makes it possible to reliably reserve the time required for the protrusion of the head element. In another case, it is desirable that the heater be brought into the ON state in the timing in which the head element arrives at a target track, and that the heater be continuously kept in the ON state until the head element accesses the data area. This makes it possible to effectively balance a decrease in the possibility of a collision of the head element with the reservation of the time required for the thermal expansion. In still another case, it is desirable that the heater be brought into the ON state in response to the completion of the seek operation, and that the heater be continuously kept in the ON state until the head element accesses the data area. This makes it possible to further reduce the possibility that the head element will collide with the medium.

It is desirable that in the seek operation, the controller include a speed control mode which uses speed information, a position control mode which uses position information, and a position/speed control mode which uses the position and speed information. It is also desirable that the last mode be the position/speed control mode. As a result, it is possible to effectively perform position control of the head element. In addition, because the position/speed control mode enables more accurate position control of the head element, in other words, the head element can be more accurately positioned at a target track, it is possible to achieve the effective heater control described above.

It is desirable that a value of an electric current supplied to the heater in the ON state that is continuously kept be the same as that of a heater current supplied while the head element reads out data from the data area. This makes it possible to make the heater control easier.

According to another aspect of the present invention, there is provided a control method used for a data storage device. This control method includes the steps of: moving a slider flying above a rotating medium to perform seek operation of a head element located at the slider so that a target track is sought, and performing the seek operation with a plurality of different control modes being successively switched; and bringing a heater into an ON state after a last mode of the seek operation starts and before the head element accesses a data area, and continuously keeping the heater in the ON state until the head element accesses the data area so that the head element protrudes by thermal expansion to adjust the clearance between the head element and the medium.

By switching the heater to the ON state after the last mode of the seek operation starts and before the head element accesses the data area, it is possible to reduce a possibility of a collision between the head element and the medium, and also to cause the head element to sufficiently protrude in the timing in which the head element accesses the data area.

It is desirable to switch the heater to the ON state in the timing in which the head element enters the last mode. In another case, it is desirable to switch the heater to the ON state in the timing in which the head element arrives at a target track. In still another case, it is desirable to switch the heater to the ON state in the timing in which an access to the data area is allowed after the head arrives at a target track.

It is desirable that the control modes of the seek operation include a seek mode, a settling mode, and a following mode, each corresponding to the distance from a target track, and that the last mode is the following mode.

It is desirable that a value of a heater current supplied while the head element reads out data from the data area be larger than that of a heater current at the time of writing data, and that a value of an electric current supplied to the heater in the ON state that is continuously kept be the same as that of a heater current supplied while the head element reads out data from the data area.

According to still another aspect of the present invention, there is provided a data storage device, which includes: a head which flies above a rotating magnetic disk; a controller which performs seek operation of the head to seek a target track; and a heater which is located at the head, after start of the seek operation, the heater being brought into an ON state in response to the arrival of the head at a track that is away from the target track by the predetermined number of tracks, the heater being continuously kept in the ON state until the head accesses a data area so that the head protrudes by thermal expansion to adjust the clearance between the head and the magnetic disk.

After the seek operation is started, by bringing the heater into the ON state in response to the arrival of the head at a track that is away from the target track by the predetermined number of tracks, it is possible to reduce a possibility of a collision between the head element and the medium, and also to cause the head element to sufficiently protrude in the timing in which the head element accesses the data area.

It is desirable that the controller switch the control mode of the seek operation in response to the arrival of the head at a track that is away from the target track by the predetermined number of tracks. By synchronizing switching of the control mode with heater settings, it is possible to facilitate the control. Moreover, it is desirable that the data storage device further comprises an adjustment circuit for adjusting the amount of electric current supplied to the heater, and that the controller instruct the adjustment circuit how to supply a heater current to the heater while controlling the seek operation. Controlling the heater by use of the controller for controlling the seek operation enables easier and more accurate control.

According to the present invention, in a technology for adjusting the clearance between a head and a medium by using a heater to cause the head to protrude, it is possible to improve the reliability of making access to a data area by use of the head, and also to reduce a possibility of a collision between the medium and the head.

DETAILED DESCRIPTION OF THE INVENTION

Figure 1:
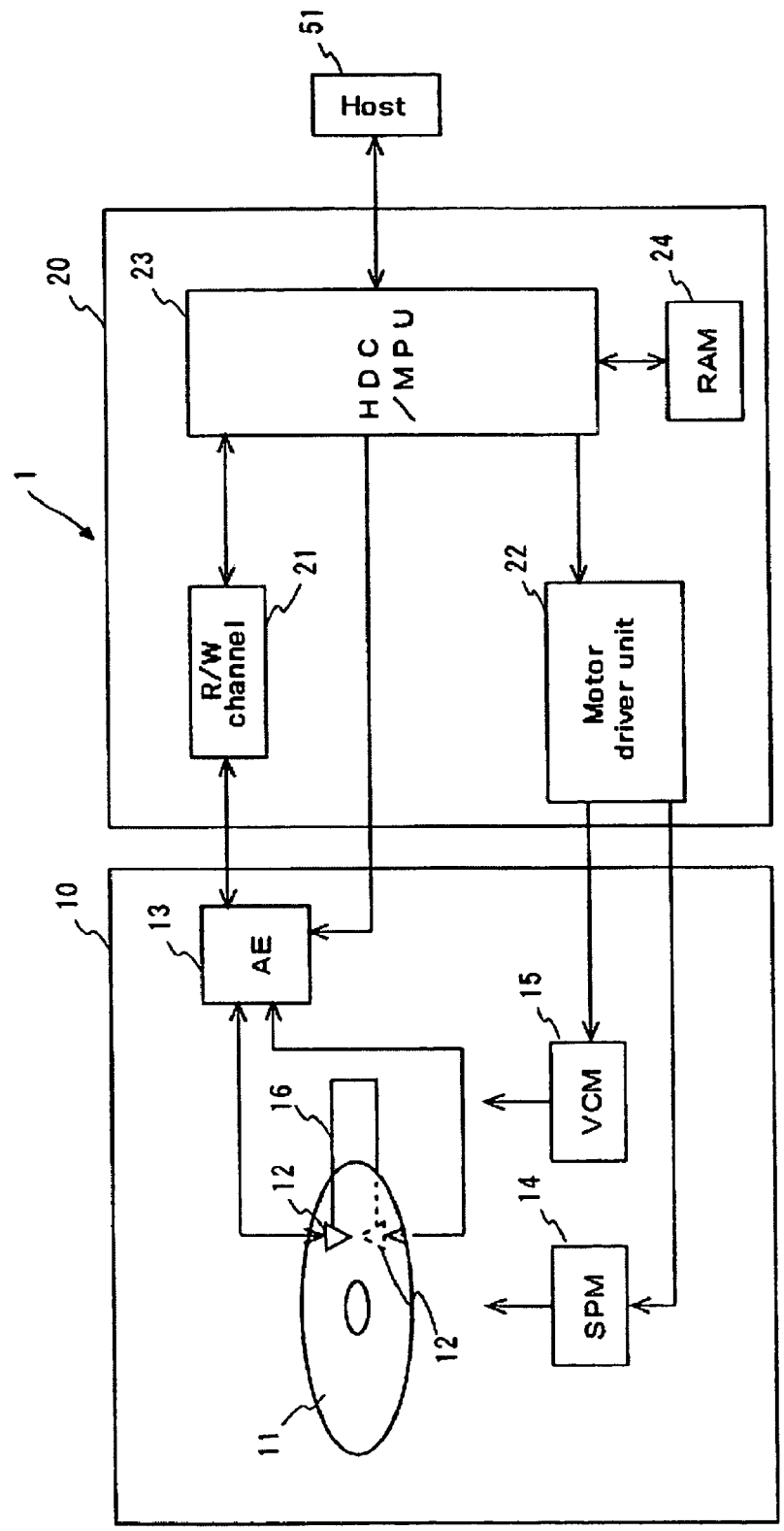
FIG. 1 is a block diagram schematically illustrating how an HDD according to an embodiment of the invention is configured as a whole.

Embodiments of the present invention will be described below. For clarification of the explanation, omission and simplification are made, where appropriate, in the following description and drawings. Also note that identical reference numerals are used to designate identical elements that are common to the figures, and that redundant description is omitted as appropriate for clarification of the explanation.

One of the characteristics of this embodiment is timing control of a heater in a data storage device capable of adjusting the clearance between a head and a medium by use of the heater. The embodiment of the present invention will be described below taking a hard disk drive (HDD) as an example of the data storage device. For easier understanding of the characteristics of this embodiment, first of all, an overall configuration of the HDD will be schematically described. FIG. 1 is a block diagram schematically illustrating an overall configuration of a HDD 1 according to this embodiment. As shown in FIG. 1, the HDD 1 includes, in a sealed enclosure 10, a magnetic disk 11 that is an example of a medium (recording medium), a head slider 12 that is an example of a head, arm electronics (AE) 13, a spindle motor (SPM) 14, a voice coil motor (VCM) 15, and an actuator 16.

The HDD 1 further includes a circuit board 20 secured to the exterior of the enclosure 10. On the circuit board 20, there are provided ICs including a read/write channel (R/W channel) 21, a motor driver unit 22, an integrated circuit 23 including a hard disk controller (HDC) and a MPU (hereinafter referred to as "HDC/MPU"), and a RAM 24. Incidentally, the above-mentioned circuitries can be integrated into one IC, or can be divided into a plurality of respective ICs for implementation. User data from an external host 51 is received by the HDC/MPU 23, sent through the R/W channel 21 and the AE 13 and then written to the magnetic disk 11 by the head slider 12. On the other hand, user data stored on the magnetic disk 11 is read out by the head slider 12. This user data is sent through the AE 13 and the R/W channel 21, and is then output from the HDCIMPU 23 to the external host 51.

The magnetic disk 11 is secured to the SPM 14. The SPM 14 rotates the magnetic disk 11 at specified speed. The motor driver unit 22 drives the SPM 14 according to control data sent from the HDC/MPU 23. The magnetic disk 11 according to this embodiment has recording surfaces on both sides. Data is written to each of the recording surfaces. The head sliders 12 are provided for the respective associated recording surfaces. Each head slider 12 comprises a slider which flies above the magnetic disk, and a head element which is secured to the slider and converts a magnetic signal to an electric signal or vice versa. The head slider 12 according to this embodiment includes a heater used for the thermal fly height control (TFC) in which heating causes the head element to protrude so that the clearance (flying height) between the head element and the magnetic disk 11 is adjusted. A structure of the head slider 12 will be described in detail later with reference to FIG. 2.

Each head slider 12 is secured to the tip of the actuator 16. The actuator 16 is connected to the VCM 15. The actuator 16 pivotally moves about a pivot shaft, which causes the head slider 12 to move in its radial direction above the magnetic disk 11. The motor driver unit 22 drives the VCM 15 according to control data (it is called DACOUT) that is received from the HDC/MPU 23. It is to be noted that the required number of the magnetic disks 11 is one or more, and that a recording surface can be formed on one side or both sides of the magnetic disk 11.

The AE 13 selects from among the plurality of head elements 12 one head element 12 that is used to access the magnetic disk 11, and amplifies (preamplifies) at constant gain a read signal read by the selected head element 12, and then transmits the amplified signal to the R/W channel 21. In addition, the AE 13 sends a write signal, which is received from the R/W channel 21, to the selected head element 12. Moreover, the AE 13 supplies an electric current to the heater, and functions as an adjustment circuit for adjusting the amount of electric current. This embodiment is characterized by timing control for the electric current supply timing for heating. This point will be described in detail later.

When transmitting user data to the host 51, the R/W channel 21 performs read processing. In the read processing, the RIW channel 21 amplifies a read signal supplied from the AE 13 so that the amplitude is kept constant, and then extracts data from the obtained read signal to perform decode processing. Data that is read out includes user data and servo data. The decoded read user data is supplied to the HDC/MPU 23.

The R/W channel 21 performs write processing of user data transmitted from the host 51. The R/W channel 21 executes the write processing according to a control signal received from the HDC/MPU 23. In the write processing, the R/W channel 21 performs code modulation of write data supplied from the HDC/MPU 23, then converts the code-modulated write data into a write signal and supplies the write signal to the AE 13.

In the HDC/MPU 23, the MPU operates according to microcodes loaded into the RAM 24. When the HDD 1 is started up, not only microcodes to operate on the MPU but also data required for control and data processing are loaded into the RAM 24 from the magnetic disk 11 or a ROM (not shown). The HDC/MPU 23 executes processing required for data processing such as read/write processing control, management of command execution order, positioning control (servo control) of the head elements 12 by use of a servo signal, interface control, and defect control, and also executes the total control of the HDD 1. In particular, the HDC/MPU 23 according to this embodiment executes TFC in the read/write processing control.

Figure 2:
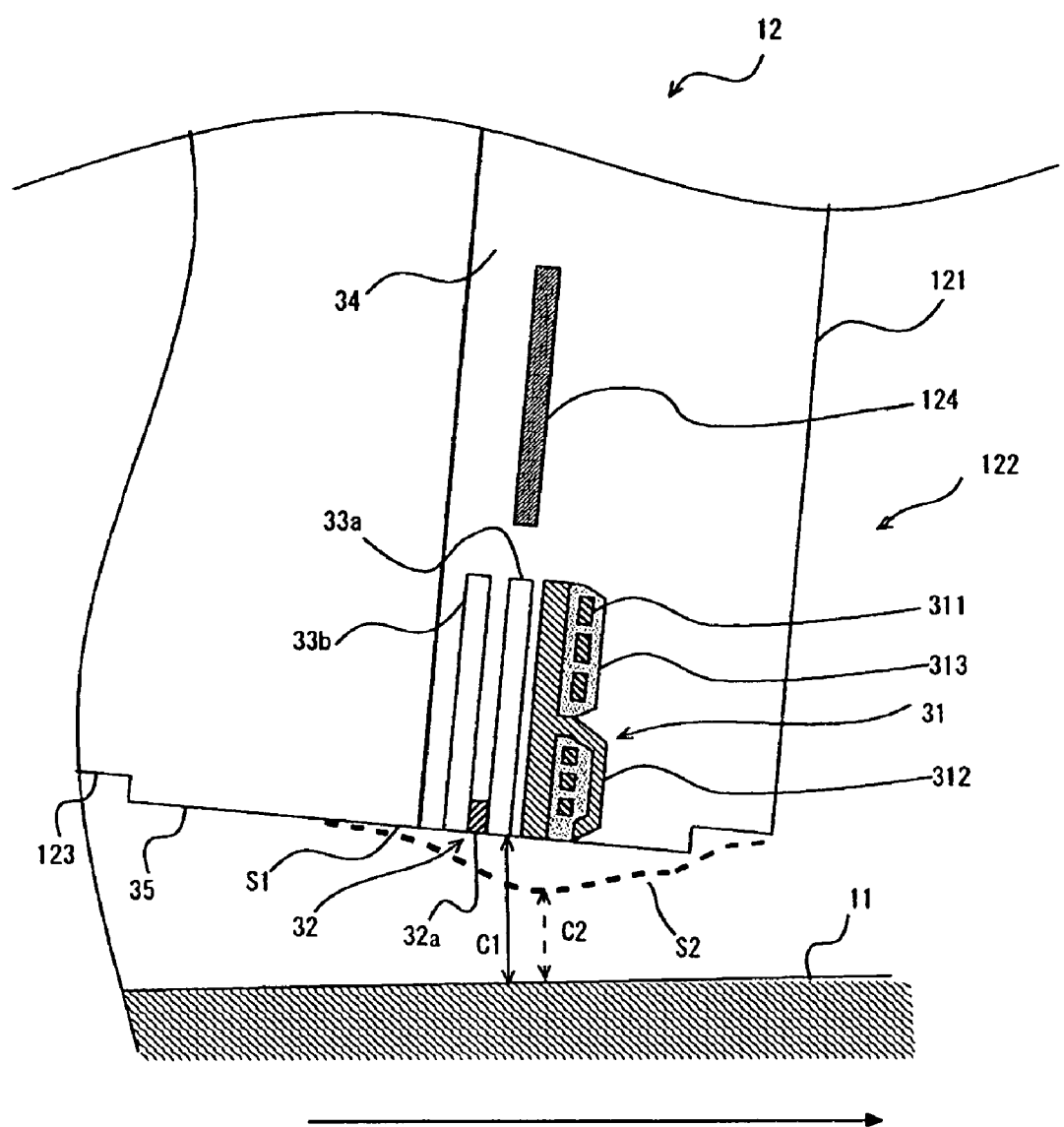
FIG. 2 is a cross section schematically illustrating a configuration of a head slider including a heater used for TFC according to an embodiment of the invention.

Next, a configuration of a TFC head slider according to this embodiment will be described. FIG. 2 is a cross section partially illustrating an area in proximity to an air-outflow end face (trailing-side end face) 121 of the head slider 12. The magnetic disk 11 rotates from the left to right in FIG. 2. The head slider 12 comprises a head element 122, and a slider 123 for supporting the head element 122. It is to be noted that the TFC according to this embodiment can be applied to both an HDD adopting perpendicular magnetic recording and an HDD adopting longitudinal magnetic recording.

The head element 122 reads and writes magnetic data from and to the magnetic disk 11. The head element 122 includes a read element 32 and a write element 31 lying on the trailing side of the read element 32. The write element 31 is an inductive element which generates a magnetic field between a write coil 311 and a magnetic pole piece 312 with an electric current flowing through the write coil 311 so as to write the magnetic data to the magnetic disk 11. The read element 32 is a magnetoresistive element. The read element 32 includes a magnetoresistive element 32a having magnetic anisotropy. According to a value of resistance that varies in response to a magnetic field from the magnetic disk 11, the read element 32 reads out magnetic data written to the magnetic disk 11.

By use of a thin-film formation process such as plating, sputtering, and polishing, the head element 122 is formed on an alumina-titan carbide substrate constituting the slider 123. The magnetoresistive element 32a is sandwiched between magnetic shields 33a and 33b. The write coil 311 is surrounded by an insulation film 313. In addition, the head element 122 is provided with a protective layer 34 (for example, made of alumina) around the write element 31 and the read element 32. Accordingly, the whole head element 122 is protected by the protective layer 34. Incidentally, a carbon protective layer having a thickness of several nm is formed on an air bearing surface (ABS) 35 facing the magnetic disk 11 so as to prevent the head element 122 from wearing out even if the head element 122 slightly touches the magnetic disk 11 for a short period of time, and so as to prevent the write element 31 and the read element 32 from corroding.

Using a thin-film process, a heater 124 constituted of a resistor made of a thin film is formed in proximity to the write element 31 and the read element 32. In this example, the heater 124 is formed in the head element 122 at a position opposite to the magnetic disk 11. For example, the heater 124 can be formed by using permalloy as a thin-film resistor in such a manner that a thin line having a thickness of 0.5 mm and a width of 3 µm meanders in an area having a depth of 60 µm and a width of 60 µm with a gap being filled with alumina. The heater 124 has a resistance of, e.g., 50 Ω.

When the AE 13 applies an electric current to the heater 124, heat of the heater 124 causes an area in proximity to the head element 122 to deform in projecting form. When the heater 124 is not heated, an ABS surface of the head slider 12 has a shape indicated with symbol S1. A clearance which is the distance between the head element 122 and the magnetic disk is indicated with symbol C1. In FIG. 2, a protruding shape S2 found when the heater 124 is heated is indicated with a broken line. When the head element 122 approaches the magnetic disk 11, clearance C2 is smaller than the clearance C1.

The heater 124 is formed to be spaced from the head element 122 in a flying direction so as to prevent the head element 122 from being heat-damaged. However, thermal expansion of a material surrounding the heater 124 is transferred to a position of the head element 122. As a result, a material surrounding the head element 122 expands such that the head element 122 approaches the magnetic disk 11. Incidentally, FIG. 2 is a conceptual diagram, and accordingly the dimensional relationship is inaccurate. For example, the shape of the protruding surface S2 corresponds to the amount of protrusion in the order of nm (several nanometers).

Figure 3:
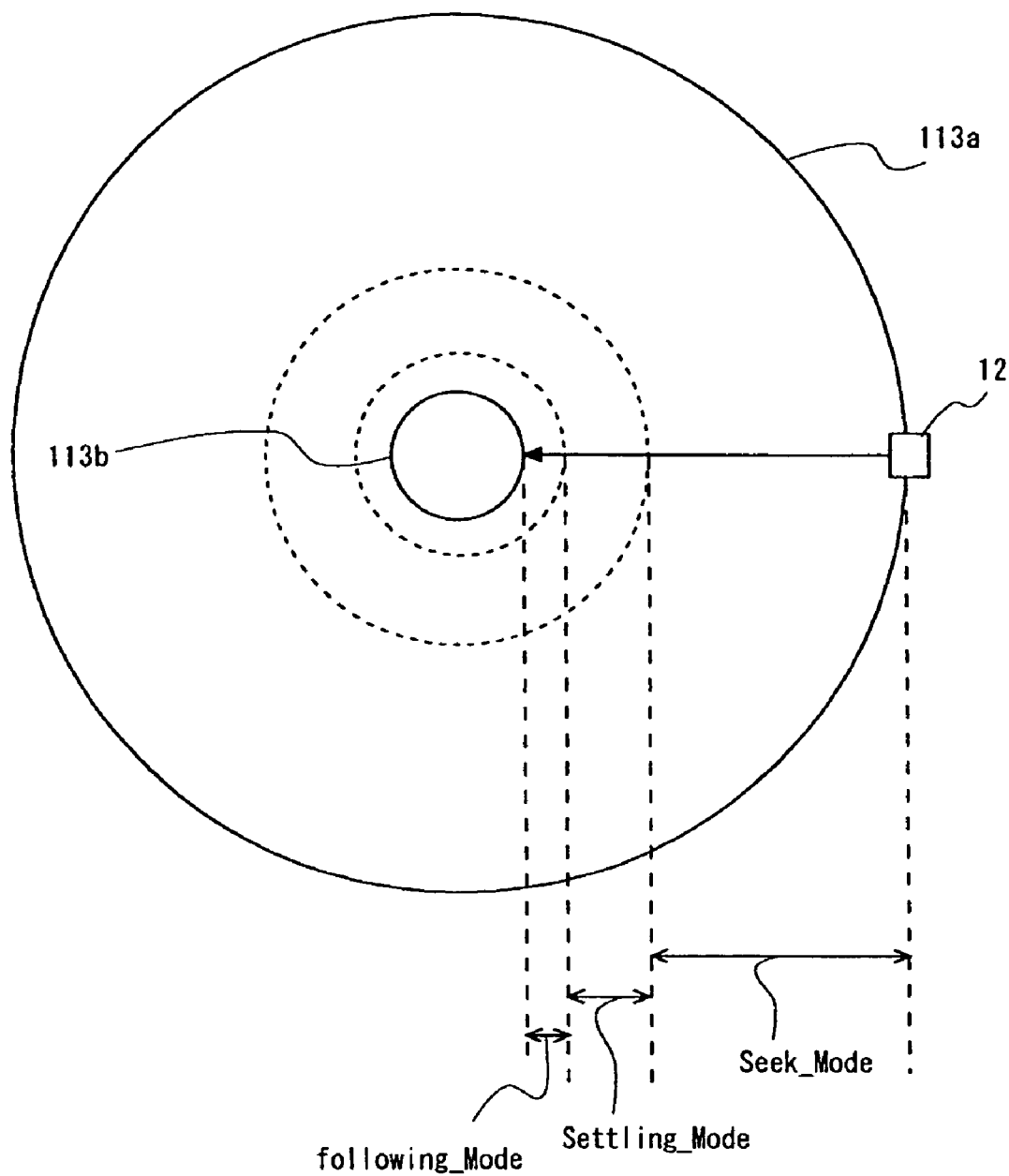
FIG. 3 is a diagram illustrating three different modes used in seek operation according to an embodiment of the invention, the three modes being a seek mode, a settling mode, and a following mode.

The HDD 1 according to this embodiment is characterized by the timing control of supplying a heater current used for TFC when the head slider 12 accesses a target sector. As shown in FIG. 3, for read or write, the HDD 1 moves (seeks) the head slider 12 to a target track 113b from a current track 113a or a resting position. Incidentally, if the current track is the same as the target track, the head slider 12 is positioned at the track just as it is.

A plurality of tracks 113, each of which has a specified width in the radial direction, are concentrically formed on the recording surface of the magnetic disk 11. Servo data and user data are written along each of the tracks. One track has a plurality of data sectors between servo data. Each servo data includes not only a track address, and a sector address in the track, but also a burst pattern used to position the head slider 12 at each track. During a seek operation, the head slider 12 moves while reading out each servo data, and the HDD 1 controls the seek operation by use of this servo data that has been read out.

After starting the seek operation to seek the target track 113b, the HDD 1 according to this embodiment turns the heater 124 ON (starts supplying the power) in the specific timing after the head slider 12 (head element 122) arrives at a target sector and before an access to the target sector is started (reading or writing of data is started). After that, the power is continuously supplied to the heater 124 so that the head element 122 sufficiently protrudes in the timing in which reading or writing of data is started. As a result, even in the case of a first access sector, it is possible to read or write data reliably.

On the other hand, while the head slider 122 moves between tracks at high speed, there is an increased possibility that a collision of the head element 122 with the magnetic disk 11 will occur. Therefore, it is desirable to cause the head element 122 not to protrude as much as possible. After starting the seek operation, the HDD 1 according to this embodiment turns the heater 124 ON while the head slider 122 accesses a target sector from a track that is away from the target track by the specific number of tracks. This makes it possible to reduce a possibility that the head element 122 will collide with the magnetic disk 11, and also to reliably read/write data starting from the first access sector through TFC.

As a particularly desirable mode, the HDD 1 according to this embodiment turns the heater 124 ON after the HDD 1 enters a following mode in the seek operation. At the time of accessing the target sector, the HDC/MPU 23 typically moves the head slider 12 (head element 122) from a current track to a target track (seek). Then, the HDC/MPU 23 positions the head slider at the target track. When arriving at the target sector, the head slider 12 writes data to the target sector (write), or reads out data from the target sector (read).

In the seek operation, the HDC/MPU 23 has a plurality of control modes that differ from one another. To be more specific, the HDC/MPU 23 has three modes of control: a seek mode, a settling mode, and a following mode. The seek mode relates to speed control, which controls seek speed on the basis of the remaining distance to the target sector. The settling mode relates to position control, which controls movement of the head slider 12 on the basis of the difference between a position of the target sector and a current position of the head slider. Moreover, the following mode uses both the position control and the speed control to accumulate errors in speed of the head slider 12. Then, the errors are multiplied by a coefficient to determine a value. With a current position being corrected by this value, a position of the head slider 12 is controlled.

Under the control in the seek mode, the HDC/MPU 23 starts moving the head slider 12 from the current track 113a. When the head slider 124 arrives at a track that is away from the target track 113b by the predetermined distance, the HDC/MPU 23 switches the control mode from the seek mode to the settling mode.

When the head slider 12 further approaches the target track 113b and consequently arrives at a track whose distance (the number of tracks) from the target track 113*b* is predetermined, the HDC/MPU 23 switches the control mode from the settling mode to the following mode in response to the arrival. After that, under the control in the following mode, the head slider 12 arrives at the target track 113*b*, and is then positioned at the target track 113*b*. After the head slider 12 arrived at the target track 113*b*, several servo sectors are further required until the head slider 12 is placed at a position at which data can be read/written, in other words, until the head slider 12 is controlled so that the head slider 12 is permitted to read/write data. In the timing in which the head slider 12 is controlled to be placed at the position (state) at which data can be read/written, the seek operation is completed (seek completion).

Thus, in the specified timing after the seek mode is switched to the following mode which is the last mode in the seek operation, the HDD 1 according to this embodiment starts supplying an electric current to the heater 124. In other words, the HDD 1 switches the heater 124 from OFF to ON. As far as the head seek is concerned, if the heater 124 is turned ON before the seek operation starts or in the timing that is too early just after the seek operation starts, and the electric power is continuously supplied to the heater 124 until data is written, the possibility that the protrusion (the head element 122) of the head slider 12 will collide with the magnetic disk 11 increases. In particular, the moving distance of the head slider 12 is long before the following mode starts (until the seek mode and the settling mode are completed). Therefore, there is a high possibility that the protrusion of the head slider 12 collides with the magnetic disk 11.

In contrast to this, after the seek mode is changed to the following mode, by switching the heater 124 from OFF to ON to continuously supply the electric power to the heater 124 so that the head element 122 protrudes, it is possible to effectively prevent the head element 122 otherwise liable to be damaged, from colliding with the magnetic disk 11 in the seek operation.

Here, as described above, for the settings of the timing in which the heater 124 is turned ON, it is important for the head element 122 to sufficiently protrude by the thermal expansion in the timing in which the head slider 12 arrived at a first target sector. This makes it possible to prevent several sectors including the first target sector from being insufficiently overwritten. Accordingly, even if the heater 124 is turned ON immediately before the first target sector is accessed, there is a possibility that it will not be able to achieve the sufficient amount of protrusion.

Figure 4:
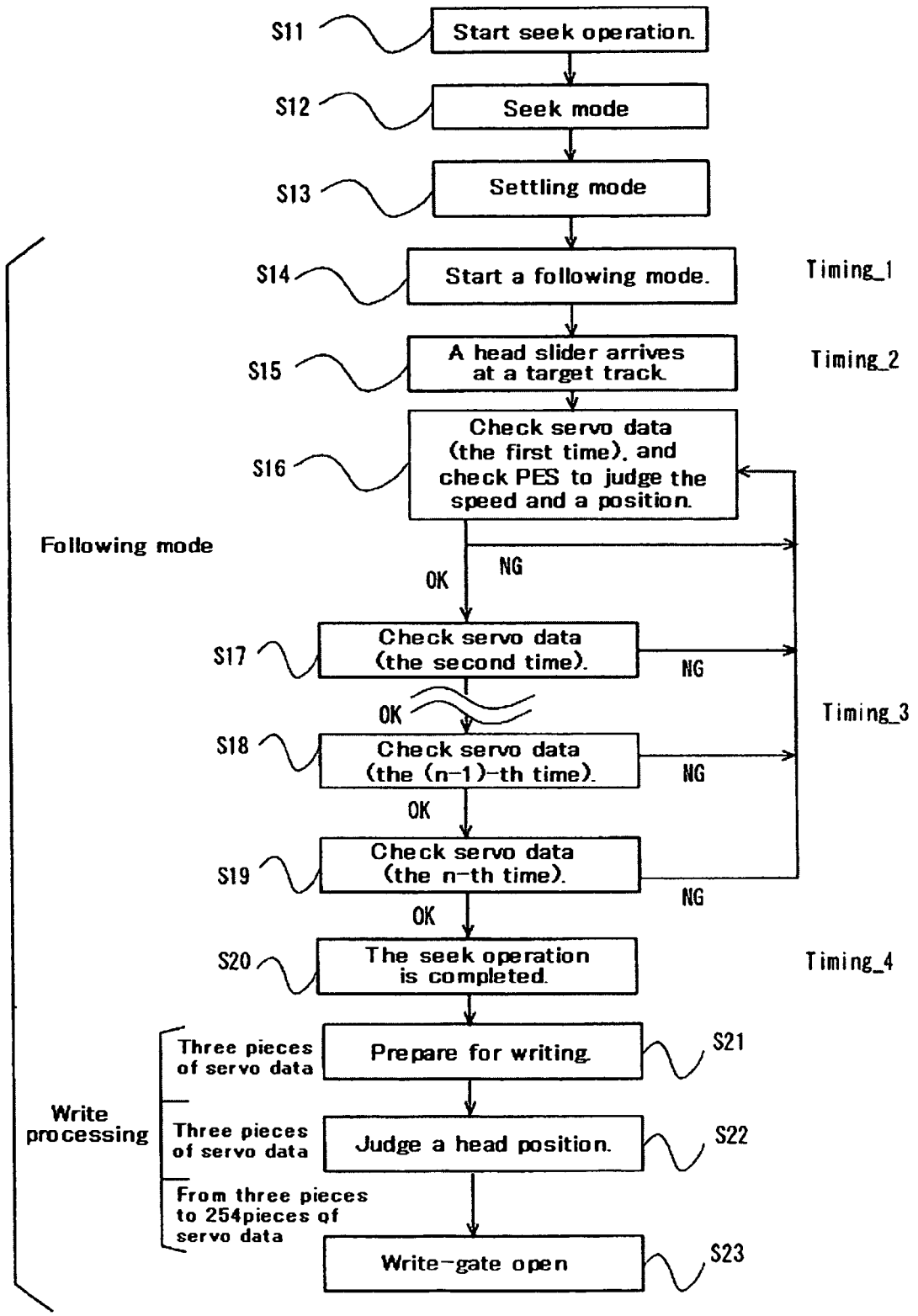
FIG. 4 is a flowchart illustrating the timing in which a heater is turned ON in a write sequence of writing data to a magnetic disk according to an embodiment of the invention.

For this reason, the timing in which the heater 124 is turned ON in the following mode will be described in detail below. The control performed in a data write sequence will be described with reference to FIG. 4. Upon receipt of a write command from the host 5, the HDC/MPU 23 starts seek operation of the head slider 12 from a current track or a retracted position toward a target track (S11). Incidentally, what will be described as below is a case where data is written. However, also in the case of data read, processing before the arrival at the target sector is the same.

At the beginning of the seek operation, the HDC/MPU 23 moves the head slider 12 in the seek mode (S12). When the head slider 12 approaches the target track and consequently arrives at a track that is away from the target track by the predetermined number of tracks, the control mode is switched from the seek mode to the settling mode (S13). For example, in the timing in which the head slider 12 arrives at a track that is away from the target track by 100 tracks, the HDC/MPU 23 switches from the seek mode to the settling mode.

After the head slider is moved in the settling mode, the HDC/MPU 23 switches from the settling mode to the following mode in the timing in which the head slider arrives at a track that is away from the target track by the predetermined number of tracks (S14). For example, when the head slider arrives at a track that is away from the target track by five tracks, the HDC/MPU 23 starts the following mode.

Under the control in the following mode, when the head slider 12 arrives at the target track (S15), the HDC/MPU 23 checks servo data to judge whether or not the head slider is in a state in which writing is allowed (S16 through S19). More specifically, by use of a value of a position signal (position error signal (PES)) read out by the head element 122, the HDC/MPU 23 judges whether or not each of the speed (head speed) of the head slider 12 and the distance from the target track (head position) is within a reference range (a range in which writing is allowed). The position signal can be determined by the address data of servo data and burst. The head speed can be determined from the difference in position signal.

If each of the head speed and the head position continuously falls within the reference range N times (N consecutive servo data), the HDC/MPU 23 judges that the HDC/MPU 23 is in the state in which writing is allowed. Then, the seek operation is completed (S20). If servo data does not fall within one of these condition ranges (that is to say, the head speed or the head position), the HDC/MPU 23 repeats the processing from the first servo data check. The number of times N is set at an appropriate value according to the design.

As soon as the seek operation is completed (S20), the HDC/MPU 23 performs preparatory processing for writing (S21), and then reads out address data (gray code) of servo data to judge whether or not a head position is within the target track (S22), before waiting for the arrival of the first target sector. Typically, a length of time equivalent to three pieces of servo data is required for the preparatory processing for writing (S21); and a length of time equivalent to three pieces of servo data is required to judge whether or not a head position is within a range of the track position (S22). When the head slider 12 arrives at the first target sector, a write gate signal used to set the R/W channel 21 at the write mode is set to assertion so as to write data to the magnetic disk 11.

With the objective of making a write in the earliest timing after judgment of the head position (S22), typically a length of time equivalent to three pieces of servo data is set. Accordingly, if the target track 256 has servo data, the head slider 12 arrives at the target sector after a lapse of time corresponding to a range from three pieces to 254 pieces of servo data after the head position is judged (S22).

In the above write sequence, after entering the following mode (S14), the HDC/MPU 23 according to this embodiment turns the heater 124 ON in any of the timing. In addition, if the timing is after write processing is started (S21), the heating time by the heater 124 is not sufficiently provided, and accordingly there is a possibility that the head element 122 will not sufficiently protrude. Therefore, supplying of the electric power to the heater 124 is started in any of the timing ranging from the start of the following mode (S14) to the completion of the seek operation (S20).

One of the desirable timing is when seek operation ends (S20) (Timing_4). Because a length of time equivalent to several servo sectors (S21 through S23) is provided even after the completion of the seek operation, if it is possible to achieve sufficient heating by the heater 124 within this period of time, it is possible to greatly reduce the possibility that the head element 122 will collide with the magnetic disk 11. The HDC/MPU 23, therefore, turns the heater 124 ON in response to the completion of the seek operation. Because the seek operation is ended, the head slider 12 is positioned, which makes it possible to further reduce the possibility that the head element 122 will collide with the magnetic disk 11.

In another case, as another desirable mode, the HDC/MPU 23 turns the heater 124 ON in response to the arrival at the target track (Timing_2). Because this timing is before the completion of the seek operation, it is possible to provide a longer period of time during which the head element 122 protrudes. On the other hand, because the head slider 12 has already arrived at the target track, it is also possible to reduce the possibility of the collision with the magnetic disk 11. Thus, two different requests balance with each other. More preferably, in response to the timing (Timing_1) in which the HDC/MPU 23 enters the following mode, the HDC/MPU 23 starts supplying the electric power to the heater 124. Because the HDC/MPU 23 is in the following mode, the head slider 12 does not extensively move above the magnetic disk 11. Accordingly, a possibility that the head element 122 will collide with the magnetic disk 11 is low. Moreover, in particular, it is possible to reliably provide a sufficient length of time during which the head element 122 expands and protrudes before data is written.

In still another case, the heater 124 may also be turned ON in the timing (Timing_3) during the judgment steps (S16 through S19) of judging the head position and the head speed. Thus, in comparison with the technique in which the heater 124 is controlled by measuring the time by a timer, by turning the heater 124 ON in the timing in which control is changed, it is possible to easily control the timing in which the electric power is supplied to the heater 124.

Here, regardless of the seek mode, the heater 124 may also be turned ON in response to the arrival of the head slider 12 at a track that is away from the target track by the predetermined number of tracks (including 0). In addition, for a period of time after the seek operation is started and before the heater 124 is turned ON in the above-mentioned timing, it is desirable that the heater 124 be always kept in an OFF state to avoid the collision of the head element 122. However, the heater 124 may also be intermittently turned ON, for example, for a period of time during which servo data is read out.

Here, the amount of electric current to be supplied to the heater 124 will be described. The head element 122 protrudes not only by heat generated by the heater 124 but also by Joule heat of the write element. Therefore, it is desirable that the HDC/MPU 23 change the amount of electric current to be supplied to the heater 124 during a period of time between a point of time at which data is read out from the magnetic disk 11 and a point of time at which data is written to the magnetic disk 11. To be more specific, while a write current is supplied to the write element to write data to the magnetic disk 11, the HDC/MPU 23 supplies the heater 124 with an electric current whose amount is smaller than that at the time of reading out data so that the calorific value thereof is reduced. In another case, the HDC/MPU 23 stops supplying an electric current to the heater 124 while data is written. As a result, the amount of protrusion of the head element 122 caused by both the write element 31 and the heater 124 becomes appropriate.

In contrast to this, as a value of an electric current to be supplied to the heater 124 that causes the head element 122 to protrude before access to the target sector is made (before an actual read or write is made) as described with reference to FIG. 5, the same value can be used for both read processing and write processing. In addition, it is desirable that the amount of electric current (corresponding to the amount of electric power) be larger than or equal to the amount of electric current at the time of reading out data. This makes it possible to cause the head element 122 to quickly protrude before access is made. Moreover, by making the amount of electric current supplied to the heater before the target sector is accessed equal to the amount of electric current while data is actually read out, it is possible to facilitate the control.

More specifically, the read element 32 does not generate heat in the read sequence in the same manner as the write element 31. Therefore, the read element 32 reads out data from the magnetic disk 11 in a state in which the electric current to be supplied to the heater is kept at the same value. Thus, by making a value of a heater current while data is read out from the magnetic disk 11 equal to a heater current in the timing before the arrival at a sector to be accessed, it is possible to properly adjust the amount of protrusion of the head element 122, and to perform the control of the heater 124 (TFC) with higher efficiency.

In the write sequence, in order to cause the head element 122 to sufficiently protrude before a write current is supplied to the write element 31, the large amount of heater current is supplied as described above. Additionally, when supply of a write current for writing data is started, the amount of electric current supplied to the heater 124 is decreased, or the supply is stopped to turn the heater 124 OFF. This makes it possible to prevent the head element 122 from excessively protruding.

Here, as described above, the amount of protrusion of the head element 122 caused by the thermal expansion varies depending on ambient temperature. Accordingly, it is desirable to vary the heater current according to the ambient temperature. To be more specific, in the high temperature zone, the heater current is made lower than that in the low temperature zone (including making a value of the heater current 0). This makes it possible to prevent the head element 122 from colliding with the magnetic disk 11 as a result of the excessive amount of protrusion of the head element 122 at high temperature.

In another case, it is possible to change, in response to the ambient temperature, the timing in which the heater 124 is turned ON. To be more specific, the HDD 1 comprises a temperature sensor such as a thermistor. The temperature sensor controls the heater current in response to the detected temperature. For example, a temperature zone is divided into three segments: low temperature, middle temperature, and high temperature. Each segment is associated with the timing in which the heater is turned ON to supply a heater current.

At low temperature, the HDC/MPU 23 turns the heater 124 ON in the timing in which the following mode starts; at middle temperature, the HDC/MPU 23 turns the heater 124 ON in the timing in which the head element arrives at a target track; and at high temperature, the HDC/MPU 23 turns the heater 124 ON in the timing of seek completion. In another case, it may also be so configured that the heater current is not supplied at high temperature. Incidentally, in the above description, the TFC in the seek operation was described. However, if a current track agrees with the target track, for example, in order to wait until the head element 122 sufficiently protrudes, it is desirable to hold access to a data area (read or write) for a length of time equivalent to one round.

Figure 6:
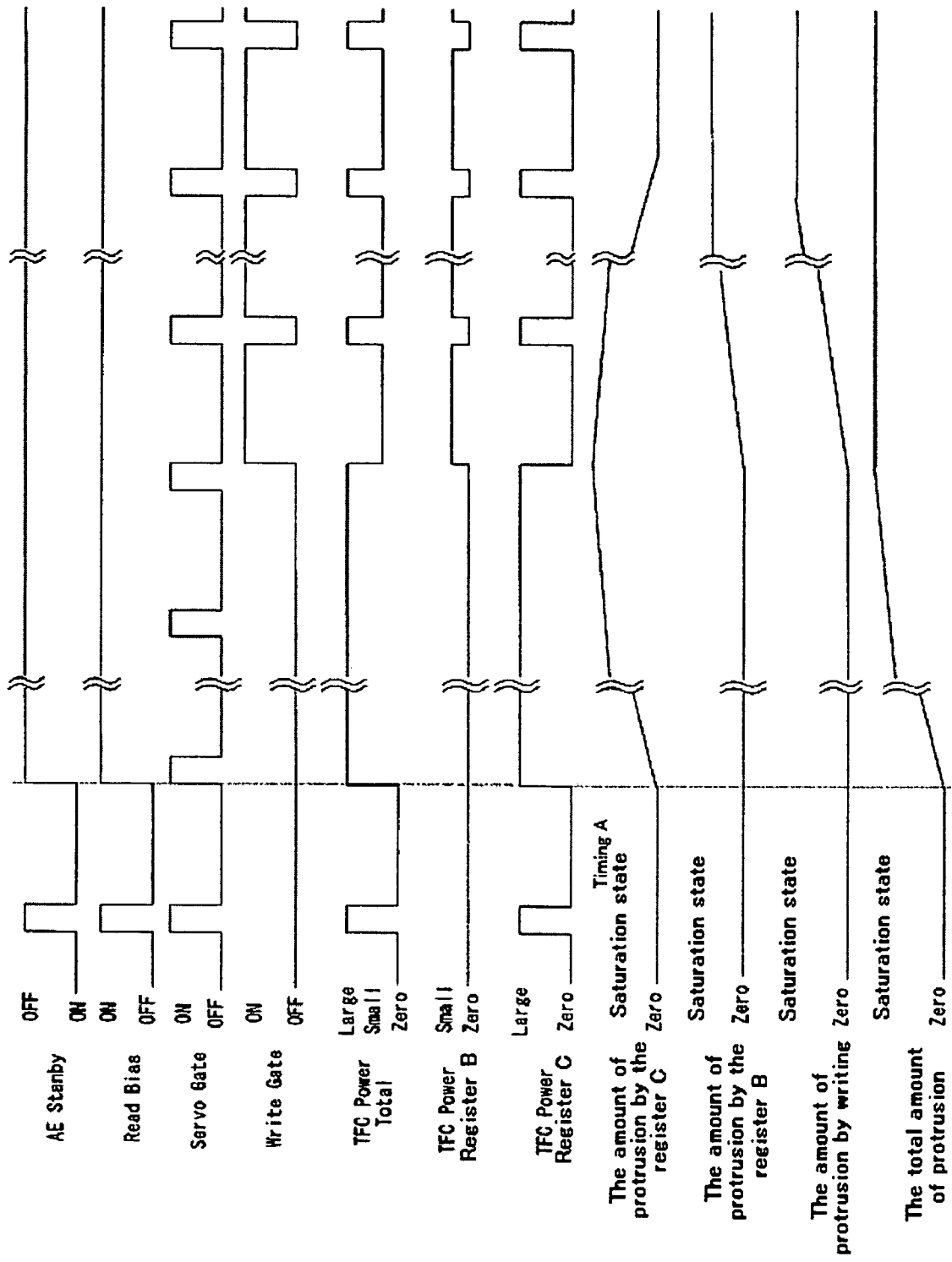
FIG. 6 is a timing chart illustrating how signals in a write sequence shown in FIG. 5 change according to this embodiment.
Figure 7:
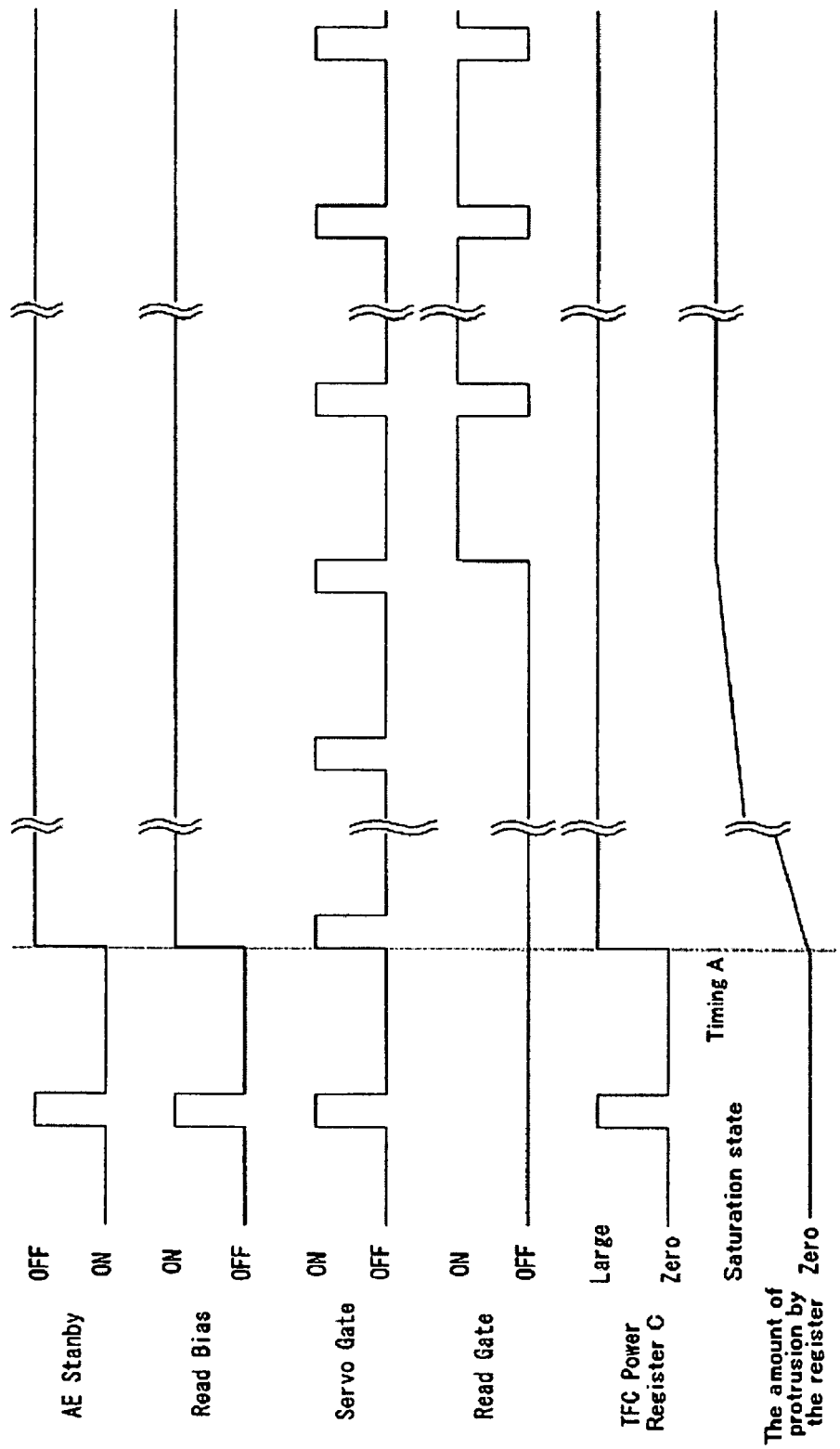
FIG. 7 is a timing chart illustrating how signals in a read sequence shown in FIG. 5 change according to this embodiment.

Next, signal processing performed in the HDD 1 according to the TFC in this embodiment will be specifically described. As described above, the HDC/MPU 23 executes TFC (control of the heater 124). FIG. 5 illustrates transmission signals transmitted among the HDC/MPU 23, the R/W channel 21, the AE 13, and the head slider 12. FIG. 6 is a timing chart illustrating the transmission signals relating to the write sequence; and FIG. 7 is a timing chart illustrating the transmission signals relating to the read sequence. Incidentally, these timing charts schematically illustrate how each signal changes, and accordingly the timing charts do not correctly reflect the actual timing in the HDD.

Figure 5:
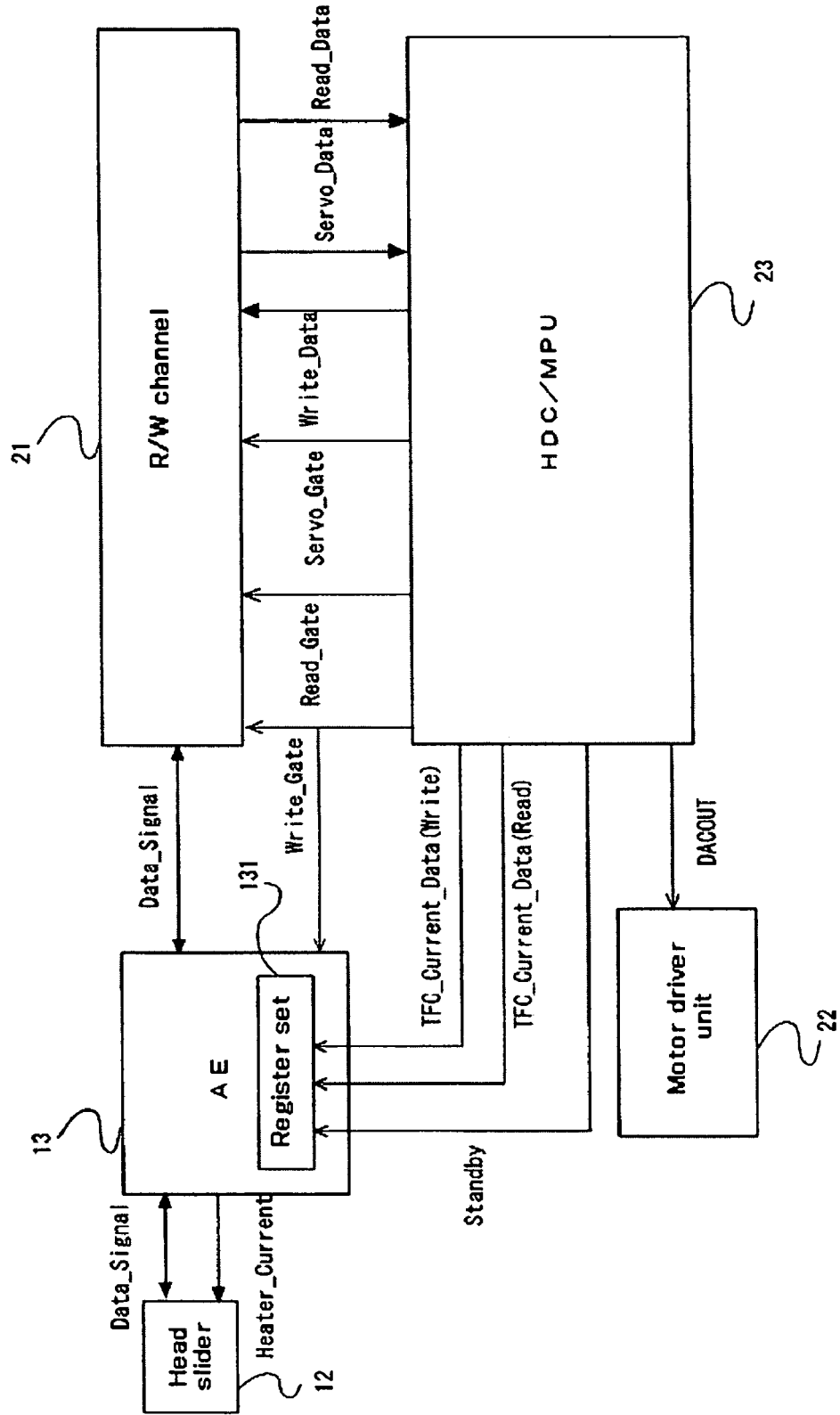
FIG. 5 is a block diagram illustrating each transmission signal transmitted among an HDC/MPU, a R/W channel, an AE, and a head slider according to an embodiment of the invention.

As shown in FIG. 5, the HDC/MPU 23 outputs control signals to the R/W channel 21. The control signals include a write gate signal (Write_Gate), a read gate signal (Read_Gate), and a servo gate signal (Servo_Gate). The write gate signal (Write_Gate) is a signal that controls writing of user data to the magnetic disk 11 (write instruction). When the write gate signal enters an ON state (write-gate open), the R/W channel 21 is set at write mode, and consequently data is written to the magnetic disk 11.

The read gate signal (Read_Gate) is a signal that controls reading of user data from the magnetic disk 11 (read instruction). When the read gate signal enters an ON state (read-gate open), the R/W channel 21 is set at read mode, and consequently user data is read out from the magnetic disk 11. Likewise, the servo gate signal (Servo_Gate) is a signal that controls reading of servo data from the magnetic disk 11. Servo data is read out from the magnetic disk 11 according to the instruction.

The head slider 12 reads out servo data or user data. The AE 13 amplifies a data signal (Data_Signal) that is output. The amplified data signal is then transmitted to the R/W channel 21. The R/W channel 21 performs specified signal processing to generate servo data (Servo_Data) or read user data (Read_Data), which is then transmitted to the HDC/MPU 23. In addition, the R/W channel 21 performs signal processing of user write data (Write_Data) received from the HDC/MPU 23. The R/W channel 21 then outputs the user write data to the AE 13 as data signal (Data_Signal). The AE 13 amplifies the data signal before outputting the data signal to the head slider 12.

The HDC/MPU 23 determines, from the obtained servo data, a value of an electric current to be supplied to the VCM, and then outputs, to the motor driver unit 22, DACOUT, which is data showing the value. The motor driver unit 22 supplies the VCM 15 with a VCM current in response to the DACOUT obtained.

Moreover, the HDC/MPU 23 accesses a register set 131 of the AE 13 to perform mode setting and electric current setting of TFC. The AE 13 has a power save mode used to decrease the electric power (hereinafter referred to as "standby mode"). When the HDC/MPU 23 stores data in a register A, operation is switched between the standby mode and a normal operation mode. In the standby mode, the AE 13 stops supplying a bias current to the read element 32; in the normal operation mode, the AE 13 supplies the bias current to the read element 32.

In addition, the AE 13 in this example further comprises two registers through which the HDC/MPU 23 sets a value of electric current (the amount of electric power: TFC Power) of the heater 124. A register B stores data indicating an electric current value of the heater while data is written to the magnetic disk 11 (TFC_Current_Data (Write)); and a register C stores data indicating an electric current value of the heater while data is read out from the magnetic disk 11 (TFC_Current_Data (Read)). A heater current before the arrival to a sector to be accessed is the same as a current value of the heater while data is read out (a value of the register C). Additionally, the HDC/MPU 23 outputs a write gate signal (Write_Gate) to the AE 13.

In the standby mode being OFF, that is, during the normal operation mode, when the write gate signal (Write_Gate) is in an OFF (closed) state, the AE 13 supplies a heater current that is set in the register C. To be more specific, when user data or servo data is read out, the standby mode is OFF and the write gate signal is OFF. Moreover, in order to cause the head element 122 to sufficiently protrude, the HDC/MPU 23 brings the AE 13 into this state in the above-mentioned timing before access to the target sector is made. ON/OFF switching of the heater 124 is controlled by standby setting data.

On the other hand, in the standby mode being OFF, that is, during the normal operation mode, when the write gate signal (Write_Gate) is in an ON (open) state, the AE 13 supplies a heater current that is set in the register B. Because the write gate signal (Write_Gate) is in the ON state, in this period data is being written to the magnetic disk 11. Accordingly, a write current is flowing through the write coil 311.

As shown in the timing chart of the write sequence shown in FIG. 6, for a period of time during which servo data is read out from the magnetic disk 11 with the servo gate (Servo_Gate) being ON (standby is OFF), including the seek time, the AE 13 supplies the head slider 12 with a heater current whose value is set in the register C. In the seek operation, the power supply during a servo read period does not cause the head element 122 to protrude substantially.

In the timing A, the AE 13 starts supplying the heater current (Large) whose value is stored in the register C. In response to it, the amount of protrusion of the head element 122 gradually increases. After that, the current value stored in the register C is kept unchanged until writing of data is started in response to the write gate (Write_Gate) that enters an ON state as a result of the arrival at a first target sector. As a result, the amount of protrusion is kept at a saturation value. In response to the start of data writing (write gate ON), the AE 13 supplies a heater current whose value is stored in the register B. As shown in FIG. 6, in consideration of the protrusion of the head element 122 caused by a write current, a current value (Small) based on a value of the register B is smaller than a current value (Large) of the register C. Then, if the write gate is ON (in other words, while a write current is supplied to the write element 31), the AE 13 supplies a current value of the register B. In the case of the other period of time, specifically, during reading out of servo data, a current value of the register C is supplied.

The HDC/MPU 23 sets the register B and the register C at 0or at a value corresponding to the ambient temperature. It is desirable that the timing in which each register is set be immediately before the seek operation starts. As shown in this example, as a result of providing the AE 13 with two registers, the HDC/MPU 23 can control a heater current in response to read processing or write processing.

As another mode, it is possible to provide the AE 13 with another register (hereinafter referred to as "register D"). This register D is a register used for ON/OFF control of the heater 124. To be more specific, the register D stores any one of the following information: data indicating that the heater 124 is in an OFF state; data indicating the register B, and indicating that the heater 124 is in an ON state; and data indicating the register C, and indicating that the heater 124 is in the ON state. According to the data stored in the register D, the AE 13 stops supplying an electric current to the heater 124, or supplies the heater 124 with a heater current whose value is stored in the register B or C.

In other words, by storing any one piece of the above data in the register D in the switching timing of the heater 124, the HDC/MPU 23 controls supplying of a heater current performed by the AE 13. The HDC/MPU 23 sets values of the register B and the register C before the seek operation is started. These values are kept unchanged until the write or read sequence ends. Incidentally, this resistor configuration of the AE 13 can also be applied to the undermentioned read sequence in like manner.

Next, TFC in the read sequence will be described with reference to FIG. 7. The relationship among signals is similar to that in the write sequence. A read bias current (Read Bias) changes in response to switching between the standby mode and the normal operation mode of the AE 13. Additionally, in the seek operation, for a period of time during which the servo gate is ON, the AE 13 supplies the heater 124 with an electric current whose value (Large) is stored in the register C. This does not cause the head element 122 to make a substantially large protrusion. In the timing A, the AE 13 starts supplying an electric current whose value (Large) is stored in the register C, and then continues supplying the electric current until the read gate (Read_Gate) enters an ON state. In response to it, the amount of protrusion of the head element 122 gradually increases, and reaches its saturation value. Even after the read gate enters the ON state which starts reading of data from the magnetic disk 11, the AE 13 supplies the electric current whose value is stored in the register C so that the amount of protrusion of the head element 122 is kept at the saturation value.

Up to this point, the present invention was described taking the preferable embodiments as examples. However, the present invention is not limited to the above-mentioned embodiments. Those skilled in the art will be able to easily make modifications, additions and alterations to each element of the above embodiments within the scope of the preset invention. For example, it is also possible to apply the TFC according to this embodiment to an HDD equipped with a head slider that includes only a read element or a write element.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising:
   a slider which flies above a rotating medium;
   a head element located at the slider;
   a controller which performs seek operation of the head element to seek a target track, and which performs the seek operation in a plurality of different control modes; and
   a heater which is located at the slider, said heater being brought into an ON state after a last mode of the seek operation starts and before the head element accesses a data area, said heater being continuously kept in the ON state until the head element accesses the data area so that the head element protrudes by thermal expansion to adjust a clearance between the head element and the rotating medium,
   wherein a value of an electric current supplied to the heater in the ON state that is continuously kept is larger than or equal to a value of an electric current supplied to the heater while the head element reads out data from the data area.

2. The data storage device according to claim 1, wherein:
   said heater is brought into the ON state in the timing in which the seek operation enters the last mode, and said heater is continuously kept in the ON state until the head element accesses the data area.

3. The data storage device according to claim 1, wherein:
   said heater is brought into the ON state in the timing in which the head element arrives at a target track, and said heater is continuously kept in the ON state until the head element accesses the data area.

4. The data storage device according to claim 1, wherein:
   said heater is brought into the ON state in response to the completion of the seek operation, and said heater is continuously kept in the ON state until the head element accesses the data area.

5. The data storage device according to claim 1, wherein:
   in the seek operation, said controller includes a speed control mode which uses speed information, a position control mode which uses position information, and a position/speed control mode which uses the position and speed information; and
   said last mode is the position/speed control mode.

6. The data storage device according to claim 1, wherein:
   a value of an electric current supplied to the heater in the ON state that is continuously kept is the same as a value of an electric current supplied to the heater supplied while the head element reads out data from the data area.

7. A control method used for a data storage device, said control method comprising:
   moving a slider flying above a rotating medium to perform seek operation of a head element located at the slider so that a target track is sought, and performing the seek operation with a plurality of different control modes being successively switched; and
   bringing a heater into an ON state after a last mode of the seek operation starts and before the head element accesses a data area, and continuously keeping the heater in the ON state until the head element accesses the data area so that the head element protrudes by thermal expansion to adjust a clearance between the head element and the rotating medium,
   wherein
   a value of an electric current supplied to the heater while the head element reads out data from the data area is larger than a value of an electric current supplied to the heater at the time of writing data; and
   a value of an electric current supplied to the heater in the ON state that is continuously kept is larger than or equal to a value of an electric current supplied to the heater while the head element reads out data from the data area.

8. The method according to claim 7, wherein:
   said heater is switched to the ON state in the timing in which the head element enters the last mode.

9. The method according to claim 7, wherein:
   said heater is switched to the ON state in the timing in which the head element arrives at a target track.

10. The method according to claim 7, wherein:
    said heater is switched to the ON state in the timing in which access to the data area is allowed after the head arrives at the target track.

11. The method according to claim 7, wherein:

said control modes of the seek operation include a seek mode, a settling mode, and a following mode, each corresponding to a distance from the target track, and said last mode is the following mode.

12. A data storage device comprising:

a head which flies above a rotating magnetic disk;

a controller which performs seek operation of the head to seek a target track; and a heater which is located at the head, after start of the seek operation, said heater being brought into an ON state in response to the arrival of the head at a track that is away from the target track by a predetermined number of tracks, said heater being continuously kept in the ON state until the head accesses a data area so that the head protrudes by thermal expansion to adjust a clearance between the head and the magnetic disk, and an adjustment circuit to adjust the amount of electric current supplied to the heater;

wherein said controller instructs the adjustment circuit how to adjust the amount of electric current to the heater while controlling the seek operation, wherein a value of an electric current supplied to the heater in the ON state that is continuously kept is larger than or equal to a value of an electric current supplied to the heater while the head reads out data from the data area.

13. The data storage device according to claim 12, wherein:

said controller switches a control mode of the seek operation among a plurality of control modes in response to the arrival of the head at a track that is away from the target track by the predetermined number of tracks.

14. The data storage device according to claim 13, wherein:

said control modes of the seek operation include a seek mode, a settling mode, and a following mode, each corresponding to a distance from the target track.

15. The data storage device according to claim 14, wherein:

the controller switches from the seek mode to the settling mode at the arrival of the head at the track that is away from the target track by the predetermined number of tracks.

16. The data storage device according to claim 14, wherein:

the controller switches from the settling mode to the following mode at the arrival of the head at the track that is away from the target track by the predetermined number of tracks.

17. The data storage device according to claim 12, wherein:

the amount of electric current supplied to the heater is adjusted based on ambient temperature.

* * * * *